April 14, 1959   C. B. EATINGER   2,882,084
FISHING GAFFS
Filed Aug. 24, 1955

INVENTOR.
*Cloyde B. Eatinger*
CLOYDE B. EATINGER

United States Patent Office 2,882,084
Patented Apr. 14, 1959

2,882,084

FISHING GAFFS

Cloyde B. Eatinger, Fort Dodge, Iowa

Application August 24, 1955, Serial No. 530,315

1 Claim. (Cl. 294—26)

My invention pertains to a device or tool to be used by fishermen to assist them in landing or catching fish.

An object of my invention is to provide a new and novel fishing gaff to assist the angler or the fisherman to land fish or to bring the fish into a boat after the fish has been hooked in the usual manner. By the use of my new and novel fishing gaff, the angler or fisherman may prevent the fish from getting off the hook during the process of landing or boating the fish.

A further object of my invention is to provide a fishing gaff that will allow the angler to get his fish or trophy without mutilating the body of the trophy, in the event he wishes to have the trophy mounted as is often the case when the angler gets a fish of considerable size.

Still another object is to provide a fishing gaff comprising component elements to prevent the fish from throwing hooks into the flesh of the fisherman during the landing of the fish, thus, providing safety to the fisherman.

Other objects of the invention will present themselves as the specifications and drawings are further studied.

The usual gaff hooks to be effective for large fish are designed in a large awkward shape and they are not easily handled when used in a crowded small boat. The usual gaff is employed by fishermen operating launches or by an extraordinary fisherman, and they are not employed by the common run of fishermen. The design, size and shape of the usual fishing gaff is not one that would appeal to the average fishermen, or one that would fit into the average tackle box. Likewise, the usual fishing gaff is too costly for the average run of fishermen, as well as being dangerous to other passengers of a small boat when a large gaff is placed in the boat.

In my invention, I provide an efficient fishing gaff that is well adapted to handle a large fish even when fishing from the ordinary small 14 or 16 foot row boat usually used in fresh water fishing. I provide a small but powerful and inexpensive fishing gaff that can easily be made small enough to fit into a small size tackle box, and yet powerful enough to control a large fresh water fish, while at the same time the cost of the gaff would be low enough to appeal to the common run of fishermen. The compactness and the efficiency of the gaff or weapon will permit the angler to easily and successfully use the weapon upon fish ranging from two to forty pounds, such as bass, walleye, pike or muskie.

It is also my aim to supply a gaff or weapon to assist the angler to catch his trophy without mutilating the body of the trophy. Often it is desirable to have the trophy mounted by a taxidermist, and one would not want the trophy scarred up by the ordinary gaff hooks.

To carry out my invention, I employ a shaft or an elongated rod being bent at one end thereof to form a handle, said handle preferably of a pistol grip type, and the opposite end of the shaft being curved to form a hook, said hook has a point and a barb thereon, a weight comprising a slug or lump of soft metal preferably of lead, said lead secured substantially at right angles to the shaft and extending away from the shaft substantially opposite and in alignment with said point. When a fish is hooked in the usual manner and the angler brings the fish up along the side of the boat or dock, the angler using the gaff to strike the fish on the head with the slightly rounded slug of lead and thereby stunning the fish and causing the fish to be inactive, the angler may then place the hook of the gaff in the gills of the fish to bring the fish into the boat or upon the dock without mutilating the body of the fish. Upon striking the fish with the slightly curved lead slug, the slug will not mar or disfigure the fish, but, the blow will be of sufficient force to render the fish unconscious for easy placement of the gaff hook.

For a better understanding of the invention, I now refer to the drawings, wherein:

Figure 1 shows a general side elevation of the gaff, with the weight integral with the gaff.

Figure 2 gives a general side elevation of the gaff, showing a barb on the hook and with dotted lines to show a semi-circular bend in the shaft, said bend secured integral with the weight.

Figure 3 gives a side elevation of the gaff, wherein the weight is releasable and said weight may be exchanged for a weight of a different size, when desired.

In the drawing, like numerals represent like parts.

Figure 1:
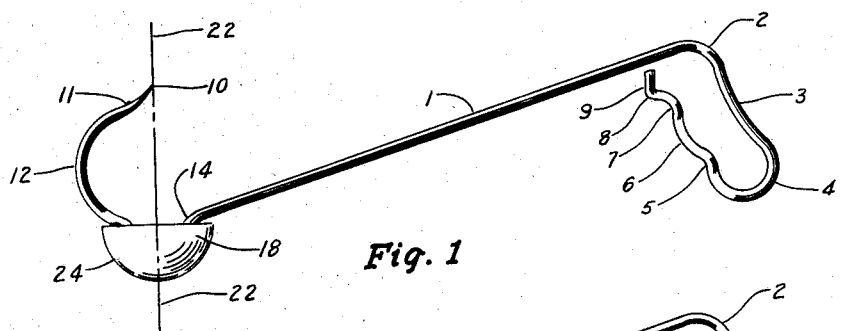

My fishing device has an elongated member or shaft 1, and one end of said member terminating in a handle. Said handle has a series of convex curves designated at 2, 4, 6 and 8 and a series of concave curves designated at 3, 5, 7 and 9 to form a pistol grip type of handle to fit the hand. Said convex and concave curves may be varied by addition or elimination to suit the discretion of the manufacturer to provide a pistol grip handle to fit the hand. The opposite portion of the elongated member 1 has an angle 14 thereon and said elongated member continues from said angle into a semi-circular bend 13 to a second bend 23, and continues therefrom into a convex curve 12 and through a straight portion 11 to a curved sharp point 10. Said point 10 has an extension extending toward the semi-circular bend and said extension terminates in a barb 15. A weight 18 has a slightly curved base 24, and said weight comprising a slug or lump of soft metal preferably of lead secured integral with the semi-circular bend 13.

Said weight above mentioned provides a slug to strike a fish on the head to render the fish unconscious, and provides a hammer-like effect to drive the point 10 into the flesh of the fish for gaffing, and also provides a stop on the gaff to prevent the fish from sliding down on the elongated member to prevent the fish from throwing the bait hook into the angler.

The point 10 is in an alignment substantially in the center of the weight 18 to permit the point 10 to be easily driven into the flesh of the fish when the gaff is swung in a hammer-like motion during the operation of gaffing the fish. Said alignment is indicated by dotted lines 22.

Figure 2:
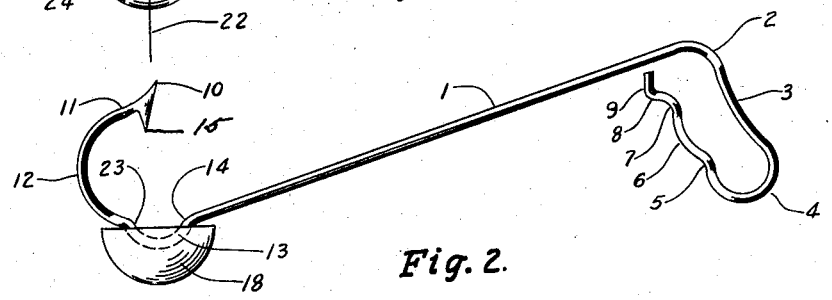
Figure 3:
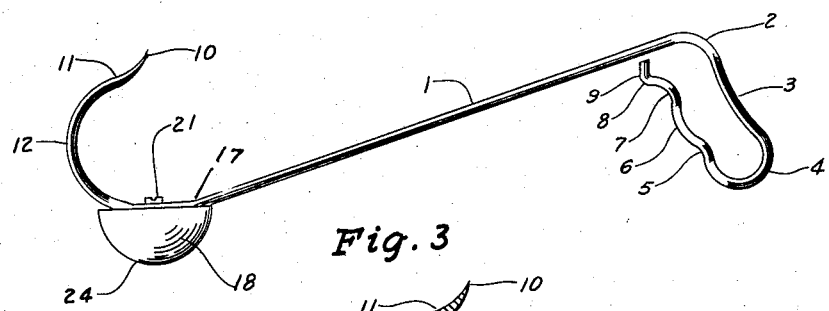
Figure 4:
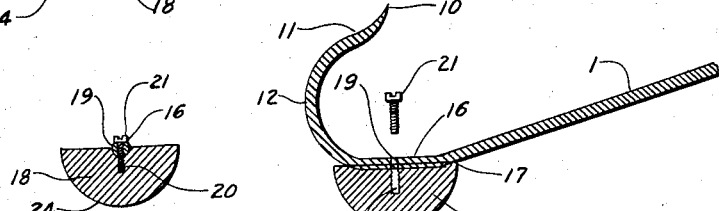
Figure 4 shows a cross section of Figure 3, as viewed from the hook end of the gaff.
Figure 5:
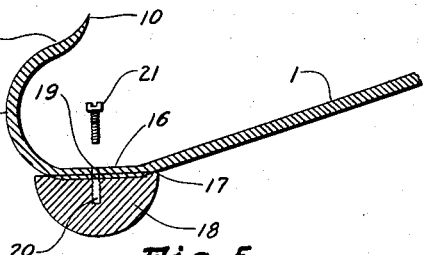
Figure 5 shows a cross section of Figure 3, as viewed from the side and showing a larger mass of weight, with the flattened portion of the shaft partially embedded into the weight mass.

A slight modification of the gaff is shown in Figures 3, 4 and 5, wherein the elongated member 1 is angled at 17 and said member continues therefrom into the flattened portion 16 and then into the convex curve 12 and through the straight portion 11 to the point 10, as is shown in Figures 1 and 2. The flattened portion 16 is embedded into the top side of the weight 18 to prevent the weight from turning; this is the same result where the elongated member is embedded integral with the weight as shown in Figures 1 and 2. A threaded opening 20 in the top side of the weight 18, and said opening 20 is adapted to cooperate with a hole 19 in the flattened portion 16 to permit a stud 21 to releasably secure the weight to the elongated member and to permit a weight of a different size to be used, when desired.

The point and barb end of the elongated member may extend straight out from the weight center in spear fashion, or said end may be bent at right angles to the weight center, or in the curved manner as shown in the drawings. The direction of the point being merely a matter of choice of the manufacturer, since the device will work successfully in either position, however, the preferred method is to use the curve 12, (11), and with the point 10 aligned substantially in the center of the weight, as shown in the drawings.

While I have shown certain specific embodiments of my invention, I reserve the right to make changes without departing from the original intent of the invention, and shall be limited only by the scope of the appended claim.

Having described my invention, I claim:

A gaff hook for fish comprising a shaft, handle means formed at one end of said shaft, said handle means being an integral extension of said shaft and being offset laterally therefrom to form a pistol grip, gaff means formed at the other end of said shaft, said gaff means including a pointed hook portion extended angularly from a junction with said shaft in a direction laterally opposite from said handle means, and a slug member secured to said hook portion adjacent said junction, the central vertical axis of said slug member extending through the terminal end portion of said hook, and said slug member being extended laterally beyond opposite sides of said hook portion so as to serve the combined functions of a pendulous weight and a stop member to prevent a fish from sliding over the hook portion and past said junction.

References Cited in the file of this patent

UNITED STATES PATENTS

| | | |
|---|---|---|
| D. 166,408 | Oake | Apr. 8, 1952 |
| 67,593 | Scribner | Aug. 6, 1867 |
| 121,873 | Hoffman | Dec. 12, 1871 |
| 1,207,367 | Buswell | Dec. 5, 1916 |
| 1,311,618 | Penn | July 29, 1919 |
| 2,450,442 | Nyman | Oct. 5, 1948 |
| 2,547,273 | Fevbre et al. | Apr. 3, 1951 |

FOREIGN PATENTS

| | | |
|---|---|---|
| 319,345 | Germany | Mar. 1, 1920 |